US005788796A

United States Patent [19]
Look et al.

[11] Patent Number: 5,788,796
[45] Date of Patent: Aug. 4, 1998

[54] DECAL ASSEMBLY AND METHOD OF MAKING SAME

[75] Inventors: Thomas F. Look, Anoka, Minn.; Franklin C. Bradshaw; Robert V. O'Keefe, both of Scottdale, Ariz.

[73] Assignee: Minnesota Mining and Manufacturing, St. Paul, Minn.

[21] Appl. No.: 737,729

[22] PCT Filed: May 19, 1995

[86] PCT No.: PCT/US95/06384

§ 371 Date: Feb. 24, 1997

§ 102(e) Date: Feb. 24, 1997

[87] PCT Pub. No.: WO95/32098

PCT Pub. Date: Nov. 30, 1995

Related U.S. Application Data

[63] Continuation-in-part of Ser. No. 354,222, Dec. 12, 1994, Pat. No. 5,580,417, and a continuation-in-part of Ser. No. 247,003, May 20, 1994, Pat. No. 5,584,962.

[51] Int. Cl.$^6$ ............................................ B44C 1/165
[52] U.S. Cl. ..................... 156/277; 156/234; 156/240; 156/249; 428/41.8; 428/202; 428/914
[58] Field of Search .......................... 156/230, 238, 156/240, 247, 234, 249, 277; 428/40.1, 78, 189, 202, 203, 914, 41.8

[56] References Cited

U.S. PATENT DOCUMENTS

| | | | |
|---|---|---|---|
| 2,647,299 | 8/1953 | Thomas | 492/19 |
| 3,027,285 | 3/1962 | Eisner et al. | 156/359 |
| 3,309,983 | 3/1967 | Dresser | 100/304 |
| 3,737,359 | 6/1973 | Levitan | 156/522 |
| 3,799,829 | 3/1974 | Heatwole | 156/235 |
| 3,864,855 | 2/1975 | Pekko et al. | 283/94 |
| 3,901,758 | 8/1975 | Humphries | 156/499 |
| 3,944,455 | 3/1976 | French | 156/361 |
| 4,028,474 | 6/1977 | Martin | 428/40.5 |
| 4,060,441 | 11/1977 | Ohta et al. | 156/234 |
| 4,068,028 | 1/1978 | Samonides | 428/41.4 |
| 4,075,049 | 2/1978 | Wood | 156/220 |
| 4,082,873 | 4/1978 | Williams | 428/42.1 |
| 4,151,900 | 5/1979 | Kirwan | 188/174 |
| 4,322,461 | 3/1982 | Raphael et al. | 428/14 |
| 4,387,000 | 6/1983 | Tancredi | 156/495 |
| 4,391,853 | 7/1983 | Pointon | 427/152 |
| 4,400,419 | 8/1983 | Laczynski | 428/41.3 |
| 4,488,922 | 12/1984 | Instance | 156/192 |
| 4,517,044 | 5/1985 | Arnold | 156/277 |
| 4,544,590 | 10/1985 | Egan | 428/41.4 |
| 4,560,426 | 12/1985 | Moraw et al. | 156/64 |
| 4,619,728 | 10/1986 | Brink | 156/555 |
| 4,645,705 | 2/1987 | Abbott, Jr. | 428/195 |
| 4,650,350 | 3/1987 | Dorner | 400/120.01 |
| 5,015,318 | 5/1991 | Smits et al. | 156/233 |
| 5,163,349 | 11/1992 | Takagi et al. | 83/386 |
| 5,232,527 | 8/1993 | Verhet et al. | 156/67 |
| 5,279,697 | 1/1994 | Peterson et al. | 156/358 |
| 5,284,688 | 2/1994 | Hiatt | 428/41.4 |
| 5,295,753 | 3/1994 | Godo et al. | 400/612 |
| 5,580,417 | 12/1996 | Bradshaw | 156/495 |
| 5,584,962 | 12/1996 | Bradshaw et al. | 156/495 |

FOREIGN PATENT DOCUMENTS

| | | |
|---|---|---|
| 3 030 179 | 3/1982 | Germany. |
| 2 126 389 | 3/1984 | United Kingdom. |
| 2 199 010 | 6/1988 | United Kingdom. |
| 2 230 250 | 10/1990 | United Kingdom. |
| WO95/29747 | 4/1995 | WIPO. |

*Primary Examiner*—James Sells
*Attorney, Agent, or Firm*—Reid & Priest LLP

[57] ABSTRACT

A decal assembly comprises a backing web, a printed label positioned on the backing web, an adhesive web applied over the label and the backing web, and a releasable liner web carrying the adhesive web and applied over the label and the backing web. The label and the adhesive web over the label define the actual decal. In a preferred embodiment, the label is made from retroreflective sheeting. Labels printed with fixed information are provided on a master roll. The endmost label is printed with variable information, separated from the master roll, and then assembled into the decal assembly. For use, the releasable web is peeled back to reveal the adhesive web, the label, and the backing web. The decal (i.e., the label and the adhesive web covering label) can then be separated from the surrounding adhesive web and the backing web and applied to a surface.

31 Claims, 11 Drawing Sheets

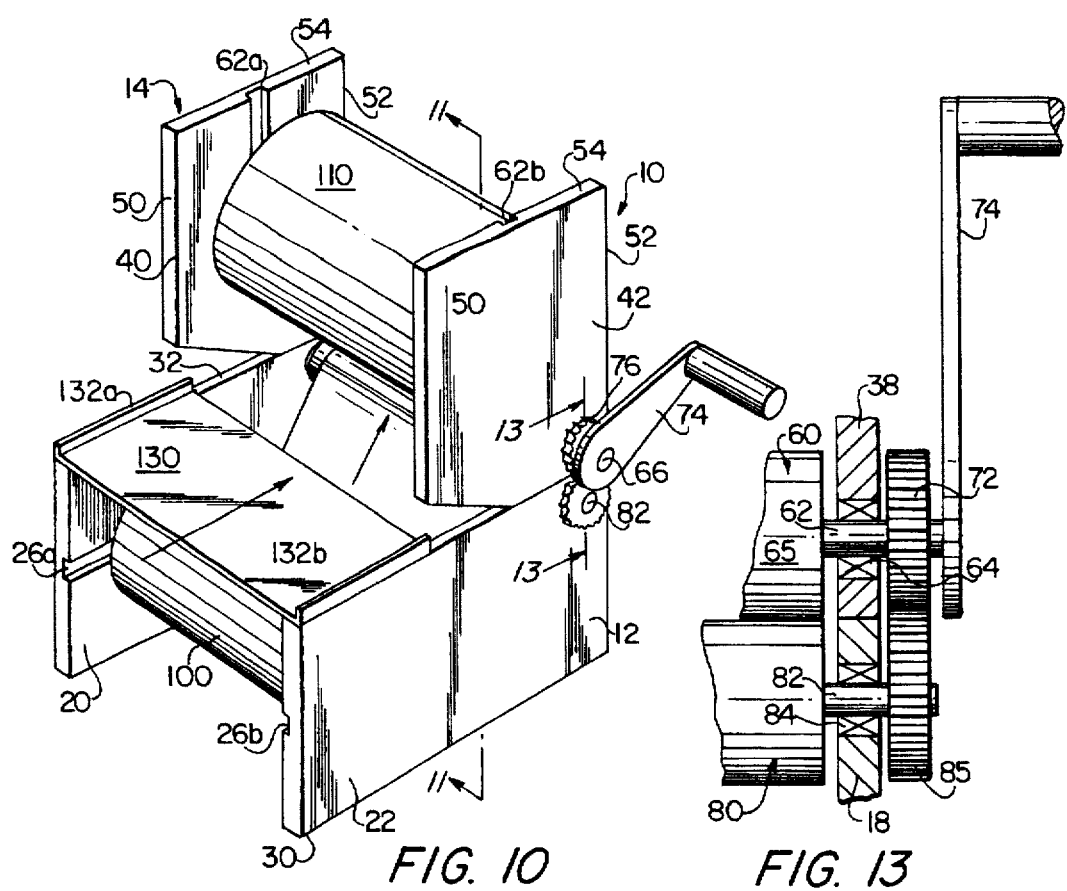
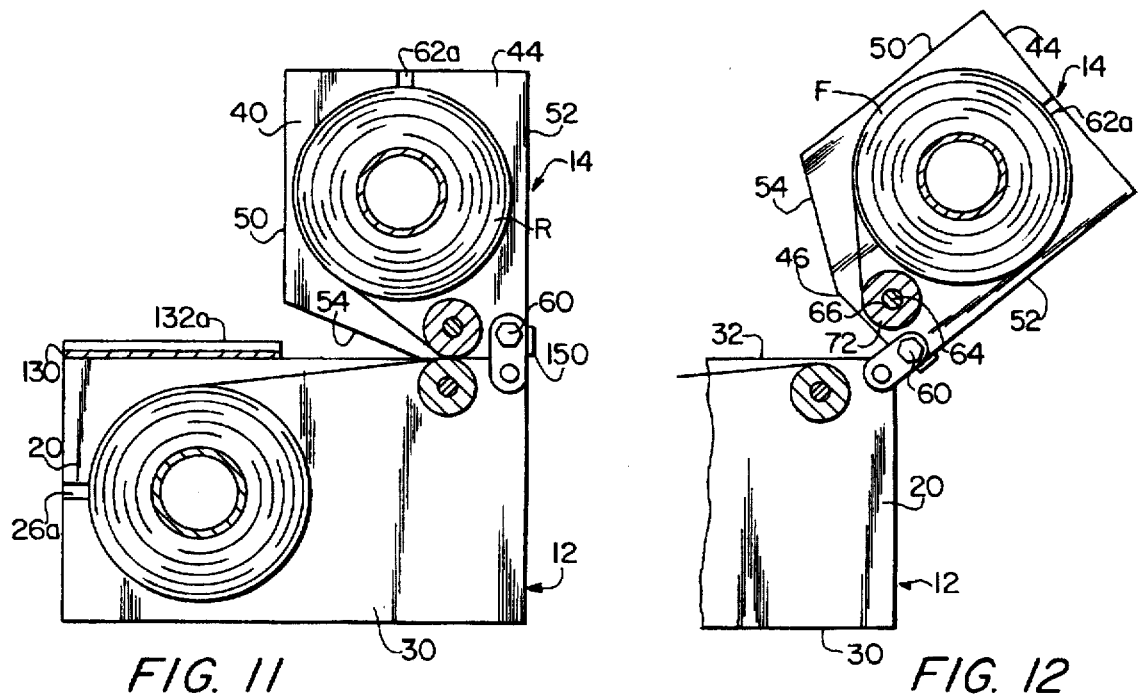

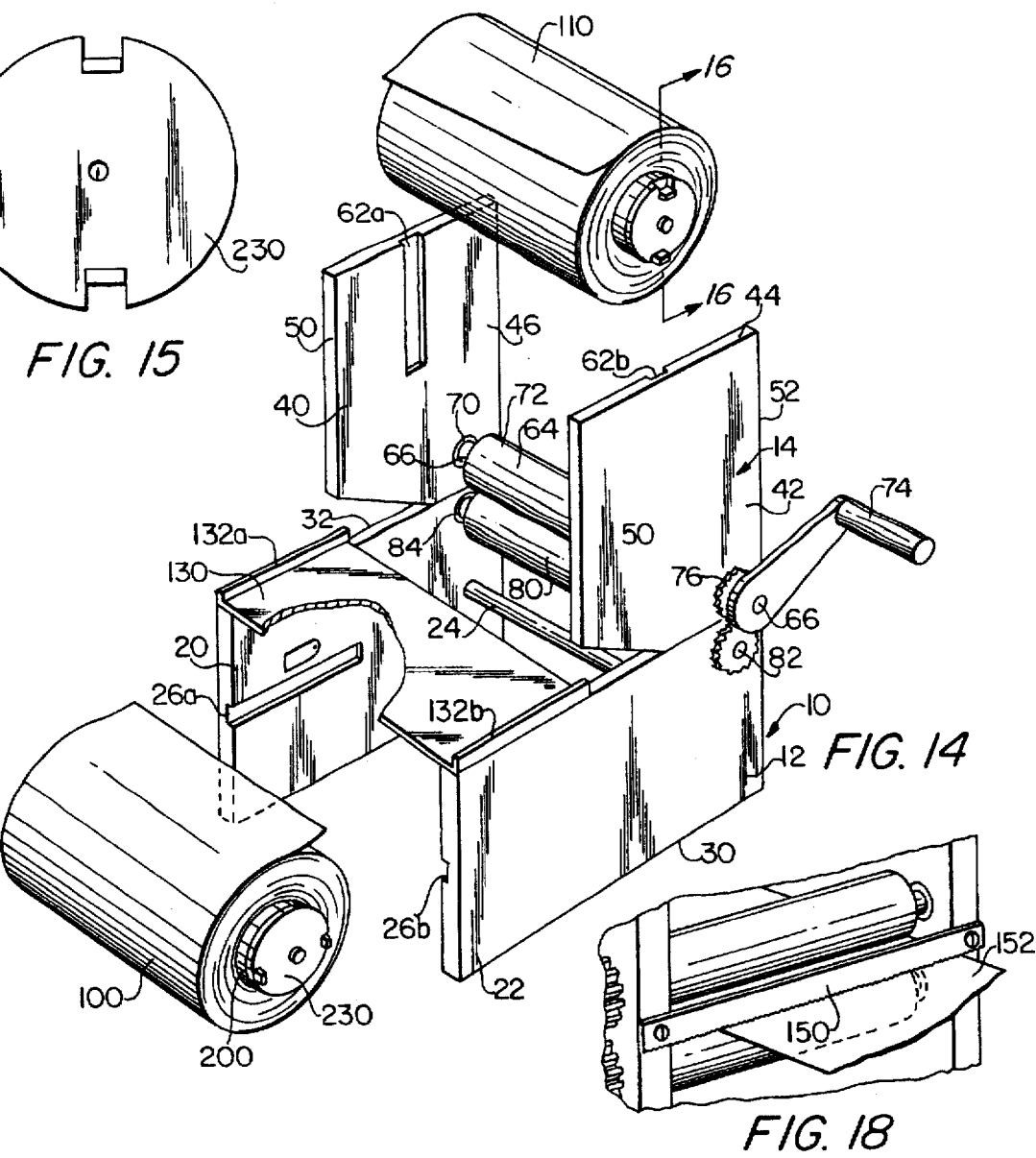

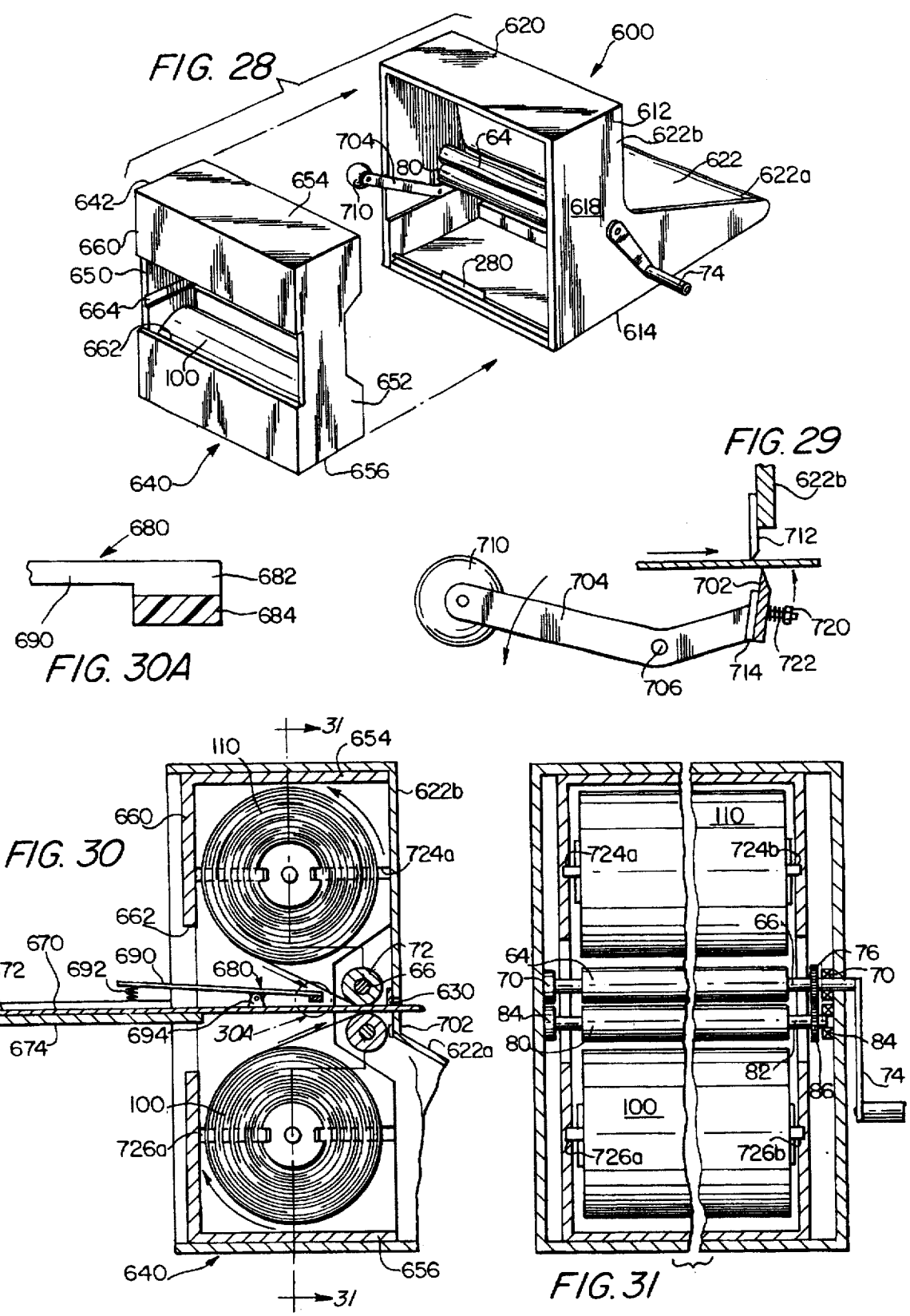

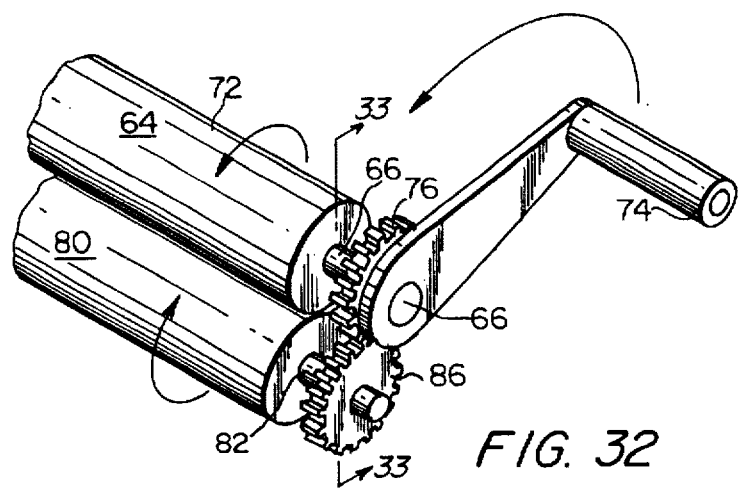
FIG. 32
FIG. 33
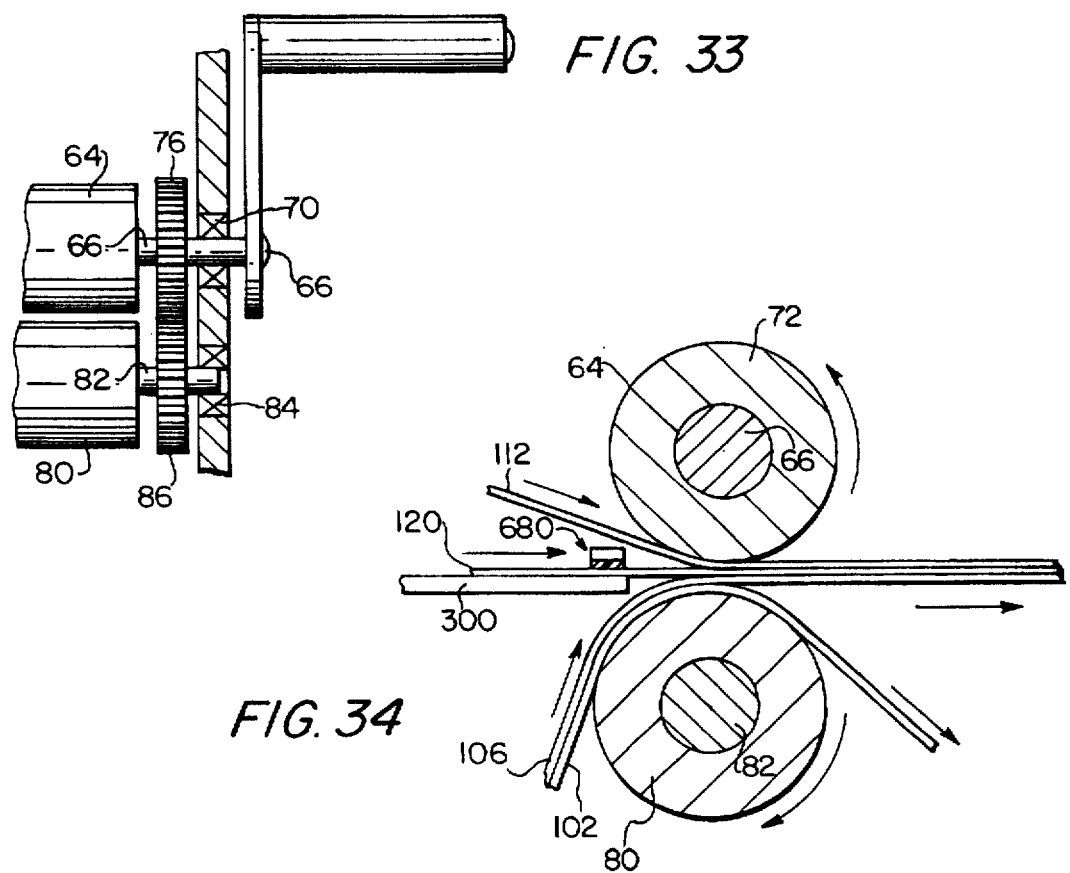
FIG. 34

000
DECAL ASSEMBLY AND METHOD OF MAKING SAME

CROSS-REFERENCE TO RELATED APPLICATIONS

This application is 371 of PCT/US95/06384 filed May 19, 1995 which is a continuation-in-part of application Ser. No. 08/354,222, filed Dec. 12, 1994, U.S. Pat. No. 5,580,417, which is a continuation-in-part of application Ser. No. 08/247,003, filed May 20, 1994, U.S. Pat. No. 5,584,962 both of which are incorporated herein by reference in their entirety.

BACKGROUND OF THE INVENTION

1. Field of the Invention

The present invention relates to decals and stickers, that is, adhesive coated labels. More specifically, the invention relates to such labels which are retroreflective, and which are provided with variable printed material, and to a method of making same which can be implemented simply and inexpensively to produce individualized labels. The present invention also relates to apparatus for laminating items and which apparatus will also transfer adhesives to substrates for purposes of producing articles such as decals and stickers.

2. Related Art

All the states in the United States validate various motor vehicle-related requirements by issuing the vehicle owner a decal to place on the vehicle indicating compliance with the particular requirement. These requirements include, but are not limited to, tax payment, vehicle mechanical inspection, emission inspections, payment for access to parking, and membership in the fire department.

At present, the decals indicating compliance with all of these requirements are made in a central location and typically are issued by one of three means: (1) The decal is applied for and returned to the recipient by mail from a central location. (2) The decal is issued from several governmental offices in the state. (3) The decal is issued by large numbers of privately owned businesses in the state. Information placed on these decals has at most a control number for the state to track the decals. In many states, the control number is essentially useless, because of the difficulty of keeping track of the recipient, where the recipient places the decal with a particular control number, and who can enforce non-compliance. Frequently, the state only has partial control over the decals sent to a particular issuing location, and must trust the issuer to return information matching recipients with decals. Due to the foregoing difficulties, states often find tracking validation decals to be problematic.

Also, fraud can be committed by stealing a decal rather than acquiring it through the proper procedures, by buying and using a counterfeit decal, and by purchasing a decal for one vehicle and using it on another vehicle (referred to as "transferring" the decal). One way to prevent fraud is to print, at the time of issue, vehicle specific information on a decal made from a material that cannot be counterfeited. This is difficult to do under present decal production systems, since the decals are produced at a central location using expensive, automated equipment.

Such expensive automated equipment cannot be cost-justified for non-centralized governmental offices (such as state motor vehicle department offices) and privately-owned locations. Thus, decals issued from many governmental offices or privately-owned locations need a low cost system that can produce the same decals as expensive, automated equipment found at a central location.

SUMMARY OF THE INVENTION

Based on the foregoing, there exists a need for an adhesive coated decal, and particularly a retroreflective decal, having variable information printed thereon, and an inexpensive and simple method of printing a retroreflective label with variable information and coating it with adhesive, as well as for a simple multi-purpose apparatus which can both serve to apply laminates to documents and papers and which will also serve to apply adhesive, including dry adhesives, to materials of various sizes so a wide variety of labels and decals can be produced. The decal and method of the present invention provide for over-the-counter issuance of a retroreflective decal having variable information printed thereon on an on-demand basis. The apparatus of the present invention can apply clear plastic laminates to master substrates of various sizes and can also transfer adhesive to substrates of various sizes not being limited by length. Adhesive transfer can be applied to either surface of the item as required. The apparatus can also apply dry adhesives from double sided release coated liners to a substrate.

In accordance with the present invention, individual labels are printed on a master web. In a preferred embodiment, the master web is a retroreflective sheeting. Micro-perforation can be provided at the corners of and between individual labels. A decal assembly in accordance with the present invention comprises a backing web, a printed label positioned on the backing web, an adhesive web applied over the label and the backing web, and a releasable liner web carrying the adhesive web and applied over the label and the backing web. The label and the adhesive web over the label define the actual decal. For use, the releasable web is peeled back to reveal the adhesive web, the label, and the backing web. The decal (i.e., the label and the adhesive web covering label) can then be separated from the surrounding adhesive web and the backing web and applied to a surface.

In an alternate embodiment, the master web on which the labels are printed comprises a thermal transfer printable strip laminated over a portion of its width and its full length with retroreflective sheeting. In addition to providing micro-perforation at the corners and between adjacent labels, micro-perforation can also be provided at the inner edge of the retroreflective sheeting to define a line of separation between the two portions of the each label. Both portions of label can be printed, for example to provide a decal and a receipt for the decal. Following its separation from the master roll, the individual label is folded along the line of separation, and then inserted into apparatus in accordance with the invention to make a decal assembly comprising a backing web, the folded label, an adhesive web applied over the folded label and the backing web, and a releasable liner web carrying the adhesive web, and positioned over the folded label. The folded label is placed in the apparatus with the laminated retroreflective portion facing the adhesive web and the unlaminated portion facing the backing web, so that only the retroreflective portion receives the adhesive. Once the adhesive-coated label is separated from the backing web, the laminated and unlaminated portions can be separated from each other along the micro-perforated line of separation.

To prevent fraud in vehical decal applications, vehicle specific information can be printed at the time of issue on a decal made from a material that cannot be counterfeited. The vehicle specific information can include, but is not limited to the vehicle identification number (VIN); license plate number (which often includes letters as well as numbers, and therefore is hereafter referred to as the "license plate characters"); make, type, and color of the vehicle; name of the vehicle owner; address of the vehicle owner; and a bar code encoding some or all of this information. Stolen, counterfeit, and transferred decals can easily by identified by visual inspection. The issuance of decals can be controlled by computer so that the state has an accurate database of decal use.

Low cost printers are available to print vehicle specific information. For decals placed on a vehicle license plate or on the vehicle body and that need to last less than two years, only a printer is needed. For window decals and decals that need to last more than two years, a secondary operation is needed. Either adhesive or a laminating film must be added after the printing operation. To date, a simple method and equipment for cost-effectively adding the adhesive or laminating film has not been available.

Three embodiments are contemplated of multi-purpose laminating and adhesive transfer apparatus for producing an adhesive, retroreflective label in accordance with the present invention. In a first embodiment, a multi-purpose laminating and adhesive transfer device is provided which has a frame member with mounting means for receiving a first roll material such as a laminate or roll of film coated with releasable adhesive. A first nip roller extends transversely across the base. An upper frame member is pivotally secured to the base. The upper frame member has means for mounting or securing a roll of material such as a laminating film or a paper or film which has an affinity for an adhesive greater than that of the release liner. A second nip roller extends transversely across the upper frame member and, with the upper frame member positioned in the operative position relative to the base, the nip rollers engage or are closely proximate to one another. An actuator which can be powered or can be manual such as a hand crank is provided for driving or rotating at least one of the nip rollers. The upper frame member can be pivoted to an open position to facilitate loading of rolls of material in the base and upper frame member and to facilitate their insertion between the nip rollers. In an alternate embodiment, one of the nip rollers is mounted on a gib plate so the rollers can be "opened".

The upper and lower rollers containing the webs of laminating or adhesive transfer material have tensioning caps which can be adjusted to prevent the rollers from overruning as they pay-out material. The tensioning caps can be pre-set by the material supplier or can be adjusted at the time of use.

A feed tray is mountable either to the base or the upper frame member for feeding the master to be processed. By way of example, the lower feed roll can be a flexible film with an adhesive and the upper feed roll a supply of film which has an affinity for adhesive greater than that of the release liner. A pre-printed master such as a master consisting of labels repetitively printed on a sheet can be fed via the feed tray to the interface between the nip rollers. Adhesive will be transferred from the bottom web to the labels with excessive adhesive being picked up by the top web. The labels are now provided with an adhesive and can be severed at a cutting edge provided at the rear of the device.

In a second, alternate embodiment, the apparatus is similar to that of the first embodiment, except that it has a frame consisting of opposite side walls. The side walls are again provided with vertically extending grooves and horizontally extending grooves which accommodate the insertion of a pair of feed rolls. In this alternate embodiment, the side walls of the frame are fixed and separation of the nip rollers is accomplished by means of a gib plate arrangement.

In a third embodiment, a multi-purpose laminating and adhesive transfer apparatus is provided which has a frame or housing with mounting means for receiving a cartridge which is insertable to supply material to perform the necessary laminating or adhesive transfer operation. The cartridge has a box-like housing in which upper and lower supply rolls containing webs of laminating or adhesive transfer material are rotatively secured. The rolls have tensioning caps which can be adjusted to prevent the supply rolls from overrunning as they pay-out material. The caps are pre-set in accordance with the operation being performed and the characteristics of the material. The tensioning caps can be pre-set by the material supplier at the time they are inserted into the cartridge. The user selects the cartridge appropriate to the operation to be performed.

First and second nip rollers extend transversely in the housing at a location intermediate the cartridge supply rollers. The nip rollers have a resilient coating and engage one another or are slightly spaced-apart in parallel relationship to one another. Preferably the lower nip roller is displayed forwardly from the upper nip roller in the direction of the cartridge. An actuator, which can be powered or can be manual such as a hand crank, is provided for driving or rotating at least one of the nip rollers which, in turn, drives the other roller.

A feed tray is removably mountable to the housing to facilitate feeding the article to be processed. Preferably the feed tray is removably secured in a general horizontal location aligned with the nip. The feed tray carries a transversely extending guide and wiper which smooths, cleans and positions the master fed along the tray. A discharge opening is provided at the rear of the housing and a cutter blade extends transversely across the housing adjacent the discharge. The cutter blade can be manually actuated by a lever to upwardly sever the substrate at a desired location is conjunction with an anvil bar.

By way of example, the lower feed roll can comprise a flexible film with an adhesive coating. The upper feed roll comprises a supply of film which has an affinity for adhesive. The upper and lower films are fed between the nip rollers. The tray is placed in position and a pre-printed master such as a master containing labels repetitively printed on a sheet can be fed via the tray to the interface between the nip rollers passing between the tray surface and the wiper. Adhesive will be transferred from the bottom film to the labels with excessive adhesive being picked up by the top film. The labels are now provided with an adhesive being picked up by the top film. The labels are now provided with an adhesive and are attached to the lower film and can be severed from one another by the cutting blade at the discharge opening. The labels can be peeled from the film substrate when used.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 10 is a perspective view of the transfer device of the present invention shown in an operative position;

FIG. 11 is a sectional view of the transfer device of the present invention shown in an operative position taken along line 11—11 of FIG. 10;

FIG. 12 is a partial side view showing the device in an open or loading position;

FIG. 13 is a view taken along lines 13—13 of FIG. 10 with the feed rolls removed;

FIG. 14 is an exploded perspective view of the device;

FIG. 15 is an end view of a feed roller;

FIG. 16 is a sectional view taken along line 16—16 of FIG. 14;

FIG. 17 is an exploded view showing the tensioning cap positioned at the end of a feed roll;

FIG. 18 is a partial rear perspective view showing the cut-off blade;

FIG. 28 is a perspective view illustrating the installation of a cartridge;

FIG. 29 is a detail view of the cutter mechanism;

FIG. 30 is a side view, partly in section, showing the cartridge in place and a master bring fed into the device;

FIG. 30A is a detail view of the wiper as indicated in FIG. 30;

FIG. 31 is a sectional view taken along line 31—31 of FIG. 30;

FIG. 32 is a detail view of the nip rollers;

FIG. 33 is a sectional view taken along line 33—33 of FIG. 32;

FIG. 34 is a side view showing a master being fed between the nip rollers;

DETAILED DESCRIPTION OF THE PREFERRED EMBODIMENTS

Figure 1:
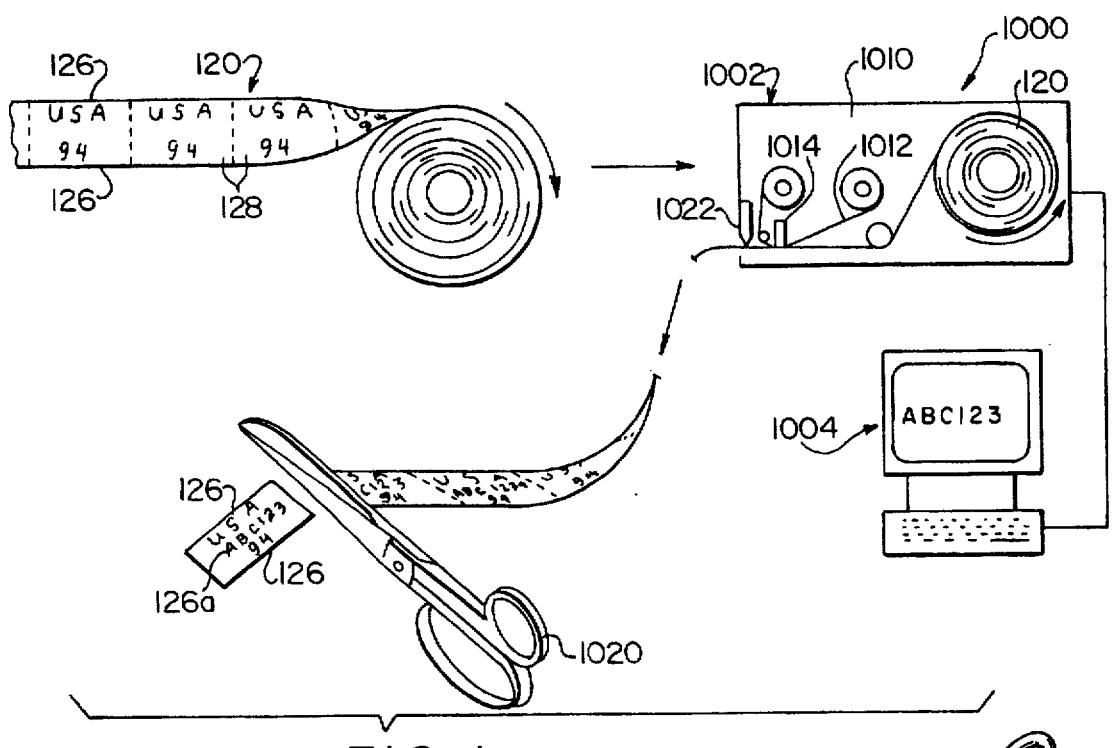
FIG. 1 is a diagrammatic view illustrating the steps of a method in accordance with the present invention for printing variable information on a label.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 2:
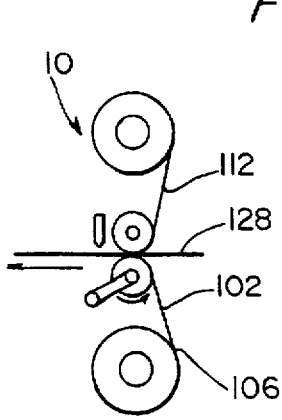
FIG. 2 is a simplified side diagrammatic view of apparatus for making a decal assembly using the label of FIG. 1.
Figure 3:
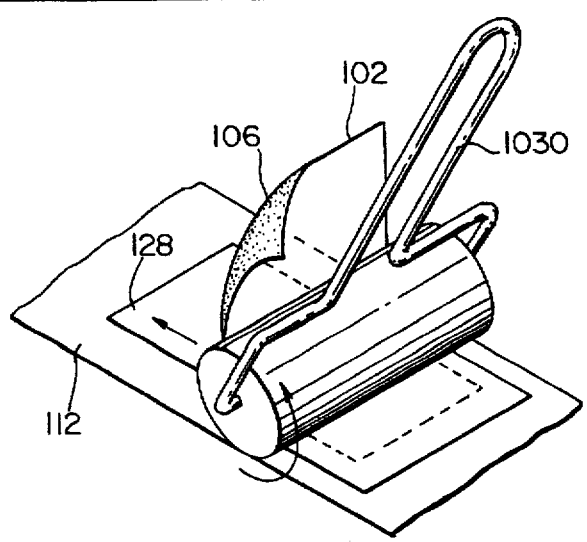
FIG. 3 is a perspective view of a hand brayer being used to make a decal in accordance with the present invention.
Figure 4:
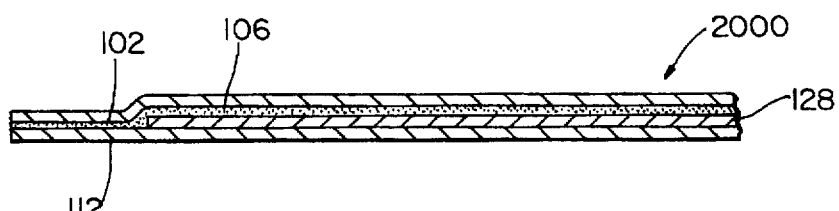
FIG. 4 is a cross-sectional view of a decal assembly in accordance with the present invention.
Figure 5:
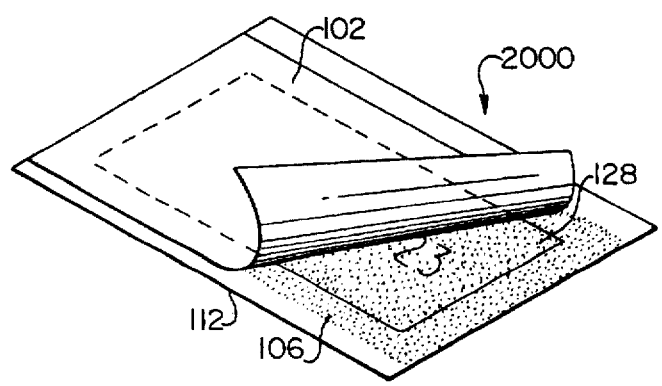
FIG. 5 is a perspective view of the decal assembly of FIG. 4 showing the release liner being peeled away.
Figure 6:
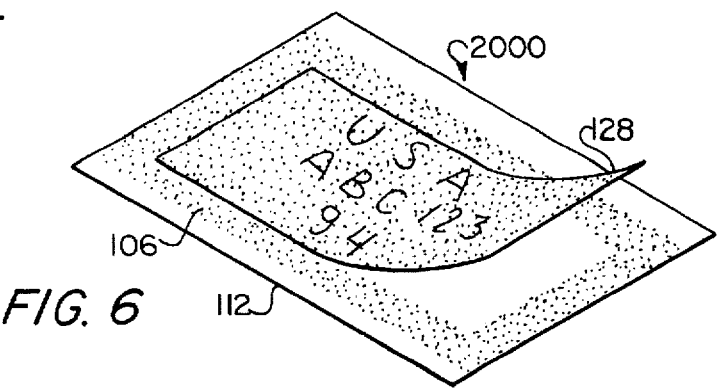
FIG. 6 is a perspective view of the decal assembly of FIG. 5 showing the release liner removed and the decal being peeled away from the backing.
Figure 8:
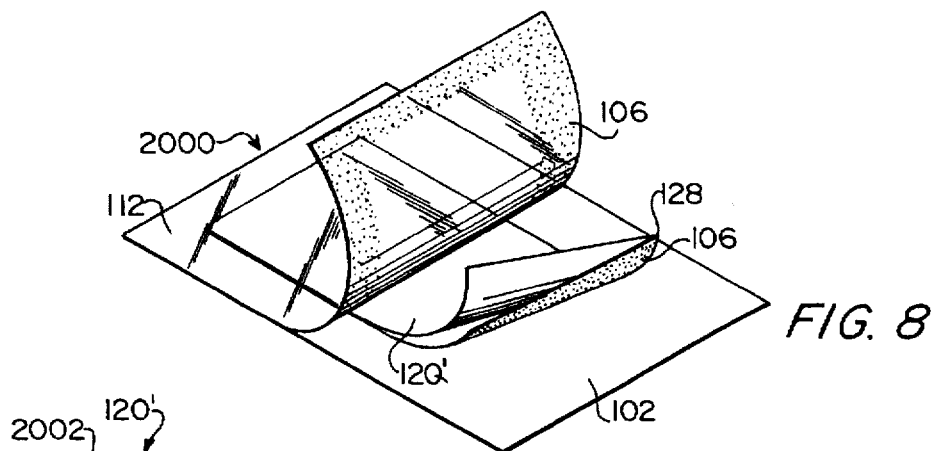
FIG. 8 is a perspective of an alternate embodiment of a decal assembly using the master of FIG. 7, folded in half along its length, showing the release liner and the label being separated from the backing sheet.
Figure 9:
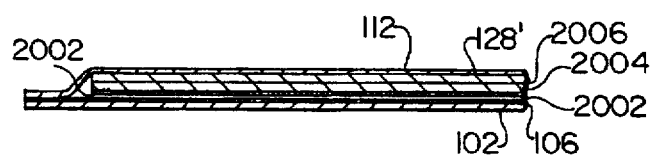
FIG. 9 is a cross-sectional view of the decal assembly of FIG. 8.

Referring now to FIGS. 1–3, there is shown simplified apparatus 1000 for making a retroreflective decal assembly 2000 of the type shown in FIGS. 4–6 or a decal assembly 2000' of the type shown in FIGS. 8 and 9, these decal assemblies 2000 and 2000' being made in accordance with the method according to the invention. A master 120 for use in the method is chosen based upon the particular application of the decal. For a window decal, master 120 preferably is an adhesive-receptive sheeting such as die cut face adhering verification ("FAV") sheeting wound on a reel or spool as shown in FIG. 1. A suitable FAV sheeting, which is difficult to counterfeit, is 3M #2500 FAV sheeting, which is commercially available from 3M. For a decal to be adhered to a vehicle body, master 120 can be, for example, 3M #3750 license plate sheeting or 3M #5330 validation sheeting, both of which are commercially available from 3M.

During manufacture, die cutting (using, for example, a conventional rotary die system) can be used to microperforate the corners for rounding and to microperforate the edges between adjacent decals 128 to facilitate the separation of individual decals 128 from each other. The "weed" (i.e., the scrap around the finished edges of the decals) can be stripped following die cutting to provide RCR (i.e., rounded) corners.

Fixed information 126 can be pre-printed in conjunction with the manufacture of the decals 128, for example in multiple colors using Flexographic™ processing, an inexpensive, high-speed printing process which uses flexible plates on a cylinder for printing graphic information in colored ink, and which is well-known to those of skill in the art. Variable information 126a can be printed easily and inexpensively on an on-demand basis using an on-site computer-controlled thermal transfer printer 1002.

A diagrammatic representation of a thermal transfer printer 1002 and a computer controller 1004 therefor, for printing variable information 126a on the master 120 is shown in FIG. 1. Thermal transfer printer 1002 is of conventional design; for example, a "Zebra Stripe" printer (which is commercially available from Zebra Technologies Corporation of Vernon Hills, Ill.) can be used. The master 120 with pre-printed fixed information 126, and wound on a reel or spool, is placed in the printer housing 1010.

Computer controller 1004 is programmed to allow the operator to input the variable information into variable information fields and print out the variable information onto a thermal wax ribbon 1012 using the printer print head 1014. For example, for a vehicle-related decal assembly, the display screen of the computer controller 1004 can prompt the operator at the issuing state motor vehicle department to obtain from the vehicle owner and input into the computer controller 1004 the necessary variable vehicle and owner information. The computer controller 1004 can be linked to a central computer, so that the vehicle and owner information can be centrally accessed by state authorities.

Printer 1002 aligns the labels 128 using timing marks pre-printed on master 120 along with the fixed information 126. The variable information 126a is then transferred from the thermal wax ribbon 1014 onto an individual decal. A suitable thermal transfer ribbon is 3M #VP5130 black thermal transfer ribbon, which is commercially available from 3M. The endmost label 128 is then cut from the roll 120 by a scissors 1020, a cutter 1022 incorporated into the printer housing 1010, or other conventional means, or is separated along the microperforations between the labels 128, and formed into a decal assembly 2000 as shown in FIG. 4, using, for example, apparatus 10 in accordance with the present invention, as shown diagrammatically in FIG. 2 or using a hand brayer 1030, as shown in FIG. 3.

The decal assembly 2000 comprises a backing web 112, the label 128, an adhesive web 106 applied over the label 128 and the backing web 112, and a releasable liner web 102 carrying the adhesive web 106, and positioned over the label 128; the label 128 and the adhesive web 106 over the label 128 defining the actual decal. Suitable adhesives for adhesive web 106 are 3M #9457, 3M #457MP, 3M #9172, and 3M #932FL, which are commercially available from 3M. As shown in FIG. 5, the releasable web 102 is peeled back to reveal the adhesive web 106, the label 128, and the backing web 112. The decal (i.e., label 128 and the adhesive web 106 covering label 128) can then be separated from the surrounding adhesive web 106 and the backing web 112 as shown in FIG. 6 and applied to a surface.

As indicated above, where the decal is to be applied to a window, FAV sheeting can be used for the label 128, and where the decal is to be applied to a vehicle body, license plate sheeting or validation sheeting can be used for the label 128. Because of the exposure which body decals receive, it is desirable to provide clear overlaminate sheeting (for example, 3M #7735FL clear overlaminate sheeting, available commercially from 3M) to the printed, non-adhesive face of the decal. This can be accomplished by adhering the overlaminate sheeting to the printed face of the label 128 prior to its assembly to the releasable web, the adhesive web, and the backing web, using the apparatus described below.

Figure 7:
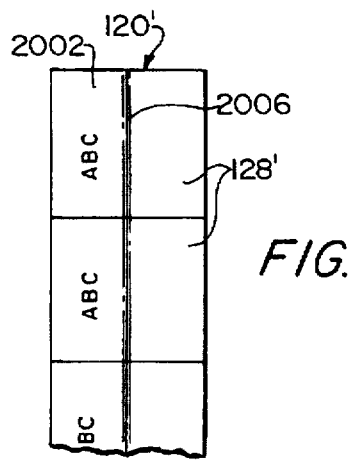
FIG. 7 is a top plan view of a master laminated along a portion of its width with a second material, for use in an alternate embodiment of the decal assembly in accordance with the present invention.

An alternate embodiment of the decal assembly 2000' is shown in FIGS. 8 and 9. For making decal assembly 2000', the master 120', shown in FIG. 7, comprises a thermal transfer printable strip laminated over a portion of its width and its full length with retroreflective sheeting 2002; retroreflective sheeting 2002 can be adhered to the master 120' by a web of suitable adhesive 2004 using conventional methods. For vehicle applications, the thermal transfer printable strip can be a polymer strip such as "Kimdura," a polypropylene polyester, or any other material which is resistant to heat and water for use in a vehicle interior.

In addition to providing micro-perforation at the corners and between individual labels 128', micro-perforation can also be provided at the inner edge of the retroreflective sheeting 2002 to define a line of separation 2006 between the two halves of each label 128'. The master 120' is printed as described above with respect to master 120. It is envisioned that the retroreflective portion of the label 128' will be printed for use as a decal, while the unlaminated portion of the label 128' will be printed for use as a receipt accompanying the decal. Following its separation from the master roll, the individual label 128' is folded along the line of separation, and then inserted into the apparatus 10 to make a decal assembly 2000' comprising a backing web 112, the folded label 128', an adhesive web 106 applied over the folded label 128' and the backing web 112, and a releasable liner web 102 carrying the adhesive web 106, and positioned over the folded label 128'. Folded label 128' is placed in the apparatus 10 with the laminated retroreflective portion facing the adhesive web 112 and the unlaminated portion facing the backing web 112. Label 12' can be folded either with the printing facing inwardly or outwardly, depending upon the desired application. Because of the fold, only the laminated portion is covered by adhesive web 106. Once label 128' with adhesive web 106 is separated from backing web 112, the laminated and unlaminated portions can be separated from each other along the micro-perforated line of separation, and the laminated portion covered by adhesive web 106 defines the actual decal.

Figure 35:
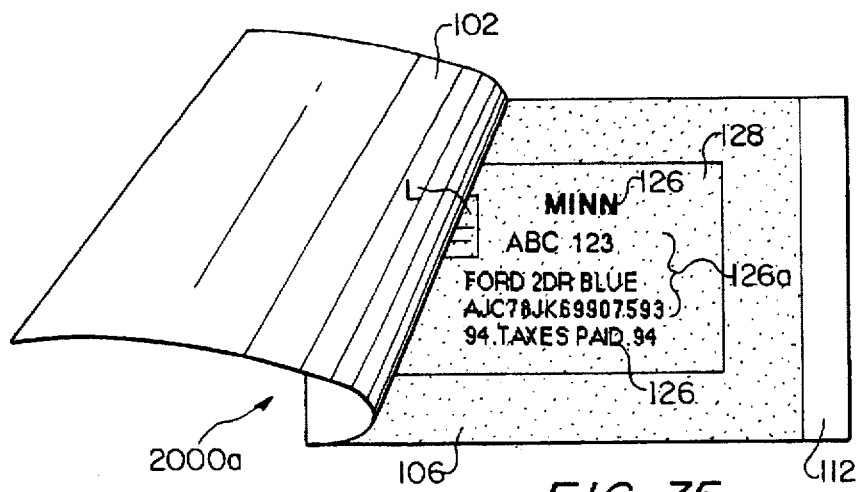
FIG. 35 shows a license plate tax decal assembly.

Examples of different types of decals and decal assemblies in accordance with the present invention are shown in FIGS. 35–40. FIG. 35 shows a license plate tax decal assembly 2000a similar in type to decal assembly 2000 shown in FIGS. 4–6. For decal assembly 2000a, the fixed information 126 printed on the master 120 comprises, for example, the state (in this case, Minnesota) and a legend identifying the decal (in this case, "94-TAXES PAID-94"); other information, such as some type of logo (indicated in FIG. 35 by reference letter L) can also be included. The variable information 126a added to the master 120 at the Motor Vehicle Department Office comprises, for example, the license plate number (shown in FIG. 35 as "ABC 123"); information identifying the vehicle, for example by make, style and color (shown in FIG. 35 as "FORD-2DR-BLUE"); and the vehicle identification number ("A5678JKG9907543" in FIG. 35). In this case, the master 120 preferably is retroreflective FAV sheeting, although other types of sheeting can also be used.

Figure 36:
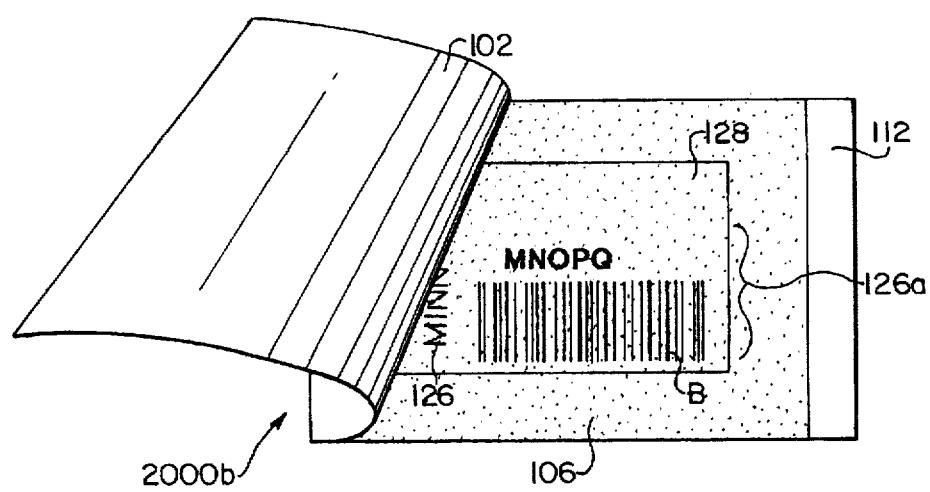
FIG. 36 shows a registration decal assembly.

FIG. 36 shows a registration decal assembly 2000b also similar in type to decal assembly 2000 shown in FIGS. 4–6. For decal assembly 2000b, the fixed information 126 printed on the master 120 comprises the state (again, Minnesota). The variable information 126a added to the master at the Motor Vehicle Department Office comprises, for example, the license plate characters (shown in FIG. 36 as "MNOPQR") and a bar code representing the license plate characters (indicated in FIG. 36 by reference letter B). Police officers equipped with a bar code reader can readily read the bar code; through conventional technology, information about the vehicle can then be obtained through a computer linked to the bar code reader. In this case also, the master 120 preferably is retroreflective sheeting, although again, other types of sheeting can also be used.

Figure 37:
FIG. 37 shows a label for use in a decal assembly providing a house, boat, or snowmobile number.
Figure 38:
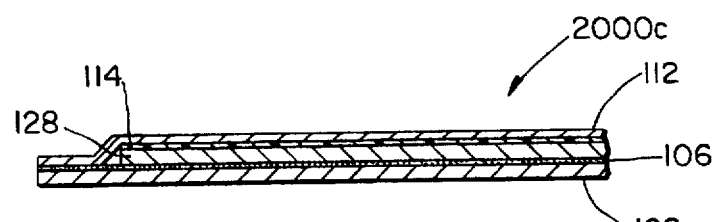
FIG. 38 shows a decal assembly incorporating the label of FIG. 37.

This type of decal assembly can be used for other applications, such as numbers for houses, boats, snowmobiles, etc. and on vehicle license plates. As shown in FIGS. 37 and 38, in a decal assembly 2000c providing a house, boat, or snowmobile number, the fixed information is omitted. The number (shown in FIG. 37 as "123") is printed as the variable information 126A, and is then laminated prior to assembly using clear overlaminate sheeting 114, as described above with respect to a vehicle body decal. The number can be printed normally or in reverse (negative).

Figure 39:
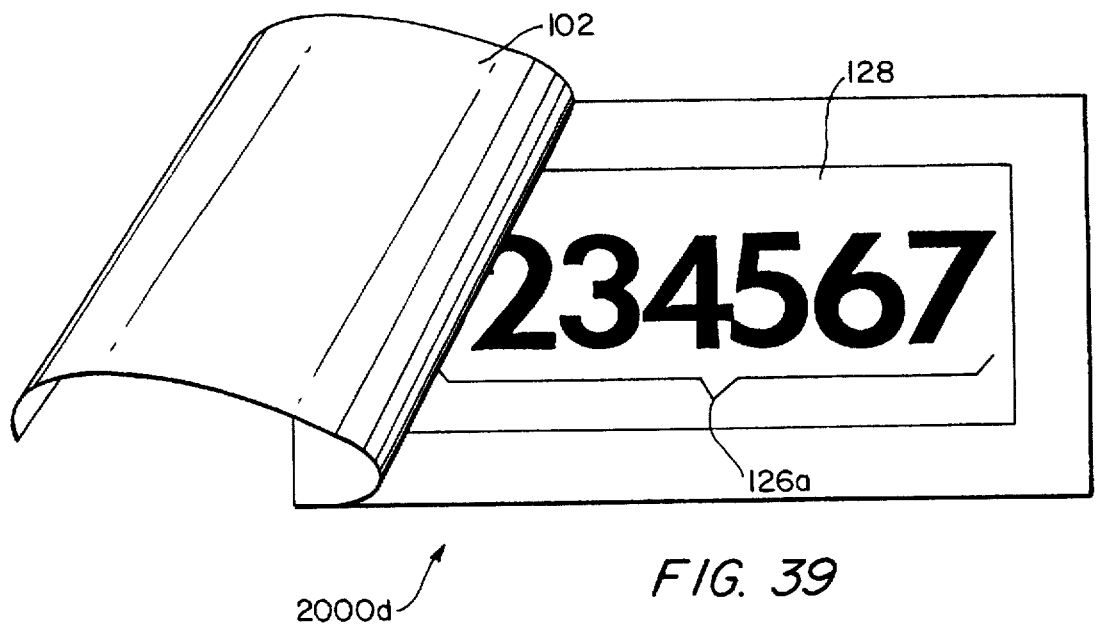
FIG. 39 shows a decal assembly for a vehicle license plate.

As shown in FIG. 39, in a decal assembly 2000d for a vehicle license plate, for example of the type used in the United Kingdom, the variable information 126a comprises the license characters (shown in FIG. 39 as "1234567") and the adhesive web 106 is applied to the printed side of the label 128. For assembly into a license plate, the release web is removed from the decal assembly, the label is removed from the backing web, and then the label is applied to an acrylic, polyester, or similar clear plastic plate which can be fastened to the vehicle.

Figure 40:
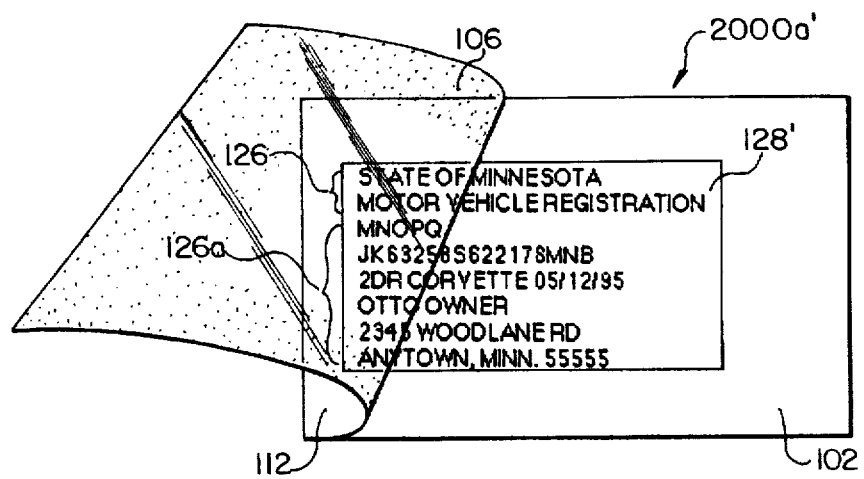
FIG. 40 shows a two-part vehicle registration decal assembly.

FIG. 40 shows a two-part vehicle registration decal assembly 2000a' similar in type to decal assembly 2000' shown in FIGS. 8 and 9. For decal assembly 2000a', the portion facing releasable web 102 comprises the decal portion to be adhered to a vehicle window, and can be printed as described above with respect to FIG. 36. The portion facing the backing web 112 comprises the receipt portion. For decal assembly 2000a', the fixed information 126 printed on the receipt portion of the master 120 comprises an identifying legend (in this case, "STATE OF MINNESOTA MOTOR VEHICLE REGISTRATION"). The variable information 126a added to the master at the Motor Vehicle Department Office comprises, for example, the license plate characters (shown in FIG. 37 as "MNOPQR"); the vehicle identification number (shown in FIG. 37 as "JK632585622178MNB"); information identifying the vehicle, for example by make and style (shown in FIG. 37 as "2 DR CORVETTE"); the date of registration (shown in FIG. 37 as "05/12/95"); and the name and address of the vehicle owner.

Referring now to FIGS. 10 to 15, there is shown a first embodiment of apparatus for making a decal assembly in accordance with the present invention. The apparatus is generally designated by the numeral 10. The terms "forward" and "rearward" or "front" and "rear" as used herein, refer to the orientation of the feed path through the device.

Apparatus 10 includes a lower frame member or base 12 and an upper frame member 14. The lower frame member 12 consists of spaced-apart side plates 20 and 22 secured in spaced-apart relationship by transversely extending spacer rod 24. The inner faces of the side plates 20 and 22 are provided with horizontally extending grooves 26a and 26b which provide mounting means to accommodate the insertion of feed rolls as will be explained hereafter. The side plates 20 and 22 are shown as each rectangular, having a bottom edge 30 which serves as a supporting surface or stand for the apparatus 10 and a horizontal top edge 32.

The upper frame member 14 includes a pair of spaced-apart side plates 40 and 42. The side plates 40 and 42 are shown as each having top and bottom edges 44 and 46 and front and rear edges 50 and 52, respectively. An angular surface 54 extends between the bottom edge and the front edge to facilitate access to the nip rollers for loading and unloading.

Plates 40 and 42 are pivotally mounted to lower plates 20 and 22 by means of pivot link 60. In the normal operative position, the bottom edge 46 of the upper side plates 40 and 42 rests on the horizontal top edge 32 of the lower side plates 20 and 22. In the open position, as shown in FIG. 12, the upper frame member 14 is rearwardly tilted about pivot link 60 to a position in which the rear surfaces of the lower end plates 20 and 22 engage the lower edges 46 of the upper end plates 40 and 42 to provide access for loading and unloading.

Feed material is secured in the upper frame member 14 by inserting a feed roll 110 into slots 62a and 62b extending vertically in the inner surface of the opposite plates 40 and 42.

An upper nip roller 64 extends transversely between the side plates 40 and 42 of the upper frame member 14 positioned adjacent the lower edge 42 of the plates 40 and 42. The upper nip roller 64 includes an axial shaft 66 which is rotatable in a suitable bearings or bushings 70. A stop nut or cap, not shown, is provided at the left end of the shaft 66, as viewed in FIG. 10.

The shaft 66 is covered by a cylindrical roller member 72 of resilient material such as rubber. The shaft 66 projects exteriorly of the side plate 42 and is shown carrying a hand crank 74 for manually rotating the roller 72 and shaft 66. Alternatively, the roller 66 can be powered by an electrical driven motor. A pinion gear 76 is secured to the shaft 66 adjacent the exterior surface of side plate 42, as best seen in FIG. 13.

A second, lower nip roller 80 extends transversely between the lower side plates 20 and 22 positioned parallel to the upper nip roller 64. The lower nip roller 80 can be vertically aligned with the upper nip roller 64 but preferably is forwardly displaced a small distance ahead of the upper nip roller 64 as for example ¼" as seen in FIG. 11. The lower nip roller 80 has a shaft 82 which is rotatable in bearings or journals 84 in the side plates 20 and 22. A lower pinion gear 86 is carried on the extension of shaft 82 at side plate 22. When the upper frame 14 is in its operative position, lower pinion gear 86 will engage the upper pinion gear 72 so that actuation of the upper nip roller shaft 66 by crank 72 or by other power means will impart rotation to both nip rollers 64 and 80.

Figure 19:
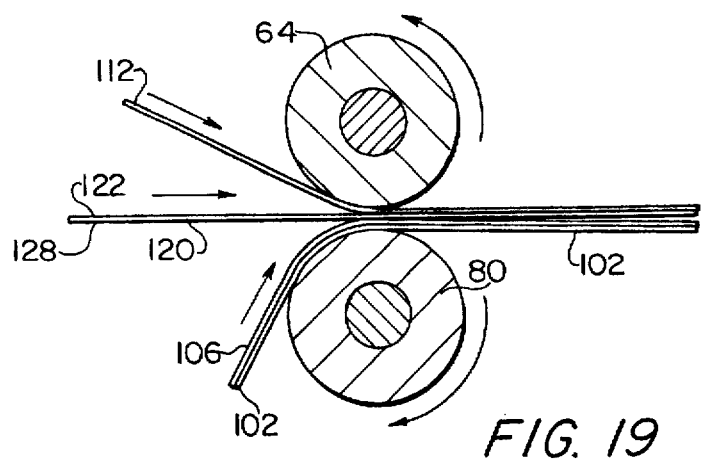
FIG. 19 is a view showing a master fed between the nip rollers.

As mentioned above, the device 10 can be used as a laminator or as an adhesive transfer device, for example to create decal assemblies. In the case of use as an adhesive transfer device, a lower feed roll 100 carrying a transferable adhesive is secured in the lower frame member 12. Referring to FIGS. 13 to 16, the lower feed roll 100 comprises a web 102 of flexible carrier material having release characteristics and an adhesive web or coating 106 on the upper surface of web 102. With the lower feed roll 100 in position, the end of the web 102 is extended over the lower roller 80 as shown in FIGS. 11 and 19. An upper feed roll 110 is positioned in engagement with the slots 62a and 62b in the interior surface of the upper side plates 40 and 42. The upper feed roll 110, in the case of adhesive transfer, will consist of a web 112 of material such as inexpensive paper or film having an affinity for adhesive. The end of the web 112 is extended between the nip rollers 64 and 80 with the end of the web adhesively secured to the web of a master 510 in the lower roll 100.

Referring to FIGS. 19 to 22, the master 120 comprises a continuous sheet of material having an upper surface 122 and a lower surface 124. The upper surface 122 is imprinted with indicia 126 forming a repetitive pattern of labels 128 which have been pre-printed as desired; the master 120 can be any pre-printed documents or series of documents. Prior to being fed into the machine, labels 128 can be pre-printed with both fixed and variable information, as previously discussed.

Once lower and upper feed rolls 100 and 110 have been positioned, the upper frame member 14 is rotated to a closed position bringing the nip rollers 64 and 80 into engagement or close proximity with the webs 106, 112 and master 120 compressed therebetween. A feed tray 130 which comprises a planar feeding surface 132 and opposite extending flanges 132a and 132b is suspended from the side plates 20 and 22 of the lower frame member 12. This is accomplished by engaging flanges 132a and 132b with the respective top edges 32 of the side plates 20 and 22.

Figure 21:
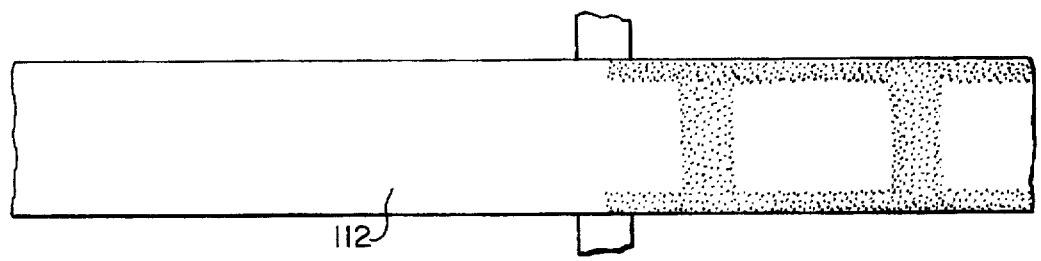
FIG. 21 is a plan view of the upper feed web showing pick up of excess adhesive thereon.

Referring to FIG. 21, cutter bar 150 is shown which extends transversely between the lower side plates 20 and 22 rearwardly of the nip rollers 64 and 80. The cutter bar 150 has a sharpened edge 152 which allows the operator to easily manually sever a master 120 at any location as it is being processed when it emerges rearwardly from between the nip rollers 64 and 80.

The master 120 is aligned on the feed tray 130 with the free edge of the master 120 positioned on the exposed adhesive web or coating 106 on the web 102 of lower feed roll 100. The slight forward protrusion of the lower nip roller 80 facilitates securing the master 120 to this location.

The operator then actuates the device 10 by operating the crank 74 which will rotate the upper nip roller 60 and by means of the inter-engaging pinion gears, cause rotation of the lower nip roller 80. This rotation will advance the web 112 of upper feed roll 110, web 102 of lower feed roll 100, and the master 120. As the master 120 proceeds between the nip rollers 64 and 80, the exposed adhesive coating or web 106 from the lower web 102 will be transferred to the lower surface 124 of the master 120. The upper web 112 will pick up any excess adhesive not transferred to the master 120, as for example areas outside the perimeter of the labels 128. The labels 128 should be narrower than the carrier web 102 and adhesive web 106, in order to ensure complete coverage of the individual labels 128 by the adhesive web 106. Further, the upper pick-up web 112 should be wider than the adhesive web 106 in order to ensure that picks up all of the excess adhesive web 106 surrounding the labels 128. The resulting decal assemblies 2000 can then be separated by severing between adjacent labels 128.

The labels 128 are shown as being on a continuous strip which has been pre-printed with the desired indicia 126 and 126a. Alternatively, a single label 128 can be printed with the required fixed indicia 126 and variable indicia 126a and then separated from the master 120 and advanced through the machine 10 in the same manner as the master 120, as described in the immediately preceding paragraph.

Note that the master 120 (or a single label 128) can be oriented either with the indicia 126 and 126a facing upwardly or downwardly, depending on the user's requirements. For example, if the adhesive-coated labels 128 are to be applied to the inside of a window, the label 128 would be in most cases fed into the machine 10 with the printing 126 and 126a downwardly positioned so adhesive 106 would be applied over the printing 126 and 126a.

The apparatus 10 also can apply lamination to either the top or bottom surfaces of a substrate or adhesive to the top or bottom surfaces of a substrate or to both, by substituting a web of laminating material for the lower carrier web 102 or the upper pickup web 112. The device 10 can also perform combination operations of applying both a laminate and an adhesive to a substrate.

The characteristics of the lower carrier web 102 are such that the adhesive 106 is non-aggressive adhesive loosely adhered to the surface of the web 112 (although, as will be appreciated by those of skill in the art, adhesive 106 must aggressively adhere to upper pickup web 112 and label 128. Thus, the lower carrier web 102 serves as a peelable covering which can be stripped away at the time the label 128 is to be used by adhesively applying the label 128 to a surface.

One significant advantage of the device 10 of the present invention is that the lower and upper feed rolls 100 and 110 can be provided to the end user pre-wound and properly tensioned so as not to overrun during operation. The proper tensioning of the feed rolls 100 and 110 is accomplished by means of a tensioning device, best seen in FIGS. 16 and 17, which is equally usable with both rolls 100 and 110. In FIGS. 16 and 17, one end of a feed roll core 200 is shown about which is wound the roll of web material of either roll 100 or 110. The core 200 is a cylinder of cardboard or plastic having an end face 210 and an interior wall 212 which receives an end cap 214. The end cap 214 can be of molded plastic or other similar material, and has a cylindrical interior wall 216. An axially-extending boss 220 is formed in the end cap 214 concentric with cylindrical interior wall 216. An axial bore 222 extends through boss 220. The end cap 214 is positioned slightly inwardly of the end face 210 of the feed roll core 200 and can be adhesively secured in place to the interior wall 212 of the feed roll core 200.

A circular end plate 230 abuts the end face 210 of the core 200 and has a diameter slightly greater than the diameter of the core 200. The end plate 230 has a central aperture 240 which receives the threaded shaft of bolt 246. A nut 250 engages the threaded end of the bolt 246 exterior of the inner end of the cap 214. A spring 252 is interposed between the nut 250 and the inner end of the cap 214. The head of the bolt 246 bears against the exposed outer surface of the end plate 230 and the position of the nut 250 determines the frictional resistance that exists between the interior surface of the end plate 230 and the end face 210 of the core 200 of the roller. This tension is pre-adjusted by the manufacturer to provide the proper roll tension depending upon the type of material, size of the material, thickness of the material and other factors.

Mounting tabs 260a and 260b project outwardly from the end plate 230 and are engageable in the mounting slots 26a and 26b and 62a and 62b provided respectively on the interior surfaces of the lower side plates 20 and 22 and the upper side plates 40 and 42 of the applicator device.

Thus, inserting a supply of feed stock either in the upper or lower frames is easily accomplished. The existing or spent feed rolls are removed by sliding them outwardly to disengage the tabs from the slots. The new roll is inserted by aligning the mounting tabs with the slots and sliding the new feed roll into place.

The feed rolls can be supplied with various types of feed stock webs such as clear laminates, paper for removing excess adhesive or rolls of material having a loose adhesive coating and a release coating on the opposite surface.

Figure 23:
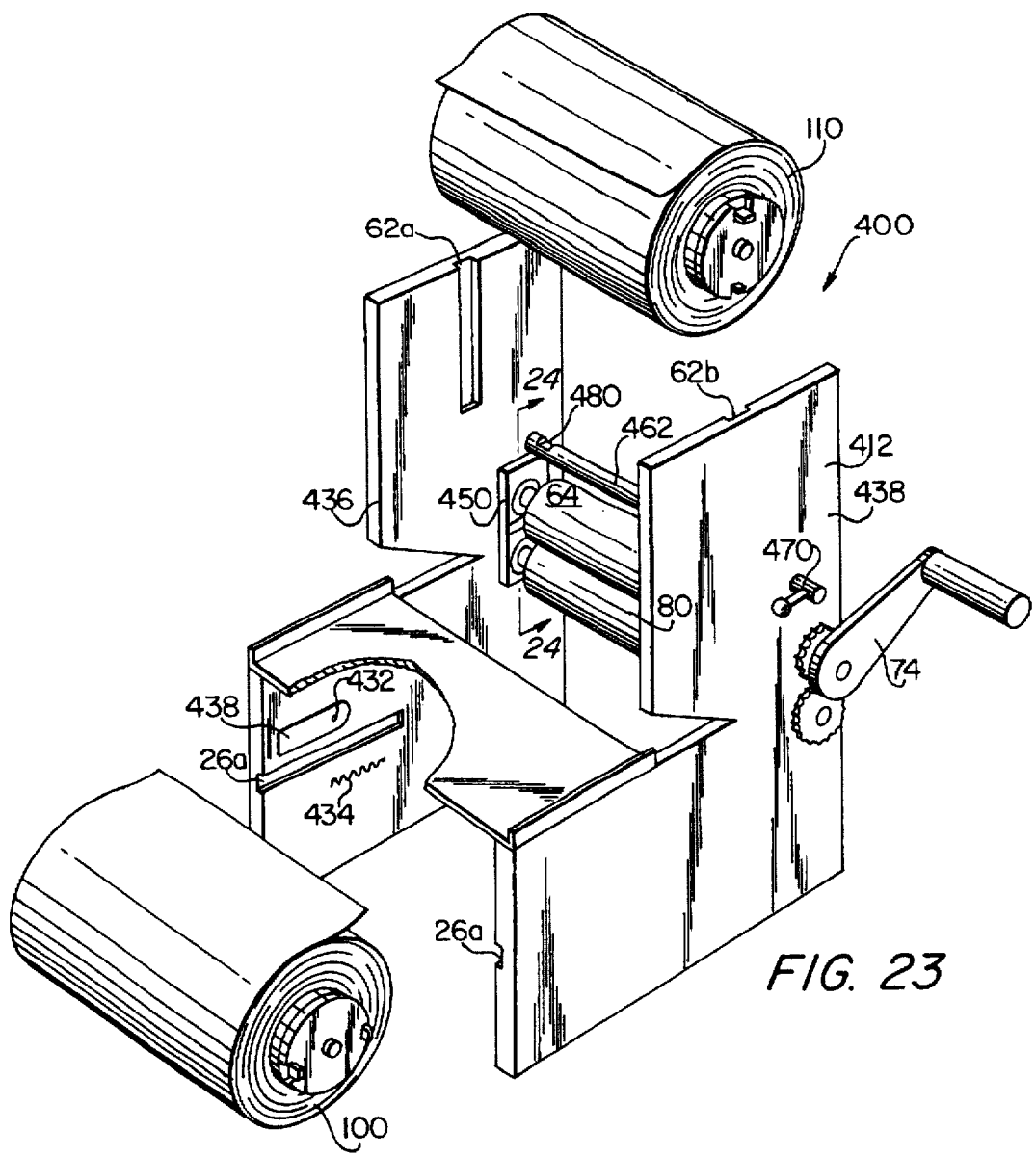
FIG. 23 is a perspective view of an alternate embodiment of the invention.
Figure 24:
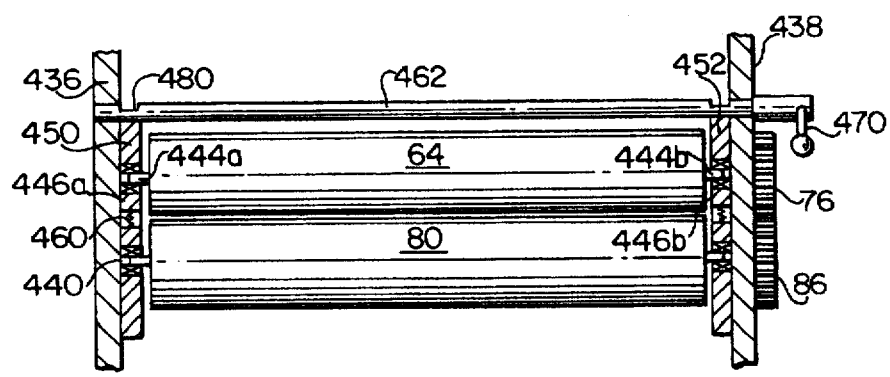
FIG. 24 is a sectional view taken along line 24—24 of FIG. 23.

FIGS. 23 and 24 show a second, alternate embodiment of the apparatus of the present invention which is generally designated by the numeral 400. Elements which are the same or similar to elements described with respect to the preceding figures are identified by the same numerals. The apparatus 400 of FIGS. 23 and 24 has a frame comprising opposite side walls 436 and 438. The side walls 436 and 438 are again provided with vertically extending grooves 62a and 62b and horizontally extending grooves 26a and 26b which accommodate the insertion of feed rolls 110 and 100, respectively. In this embodiment, the side walls 436 and 438 of the frame are fixed and separation of nip rollers 64 and 80 is accomplished by means of a gib plate arrangement as will be explained hereafter.

Because mounting slots 62a and 62b are vertically disposed, the weight of the feed roll 110 will maintain it in the proper position. Preferably, the feed rolls 100 and 110 are positioned as close to the nip rollers 64 and 80 as possible to maintain accurate feeding and to minimize misalignment. It may be desirable to provide positive biasing means to urge feed roll 100 rightwardly as shown in FIG. 23. To this end, a link 430 is pivotally secured at pivot point 432 to the interior of the side wall 436. A similar link can be disposed on the interior side wall 438. A spring 434 is disposed below the slot 26a. When the feed roll 100 is inserted, link 432 can be rotated downwardly as indicated by the arrow and engaged with spring 434 to apply a biasing force to the feed roll 100 to maintain it in a secure position.

As indicated above, it is desirable that the nip rollers 64 and 80 be separated to provide access for purposes of loading the apparatus. In the prior embodiment shown if FIGS. 10 to 14, access was provided by a two-portion frame arrangement in which one portion of the frame is pivotal with respect to the other. In the embodiment of FIGS. 23 and 24, the lower nip roller 80 extends between the interior side walls of the side plates 436 and 438 and is mounted at opposite ends in bearings 440. The upper nip roller 64 is provided with opposite stub shafts 444a and 444b which are received respectively in bearings 446a and 446b in opposite gib plates 450 and 452. Gib plates 450 and 452 are vertically slidable and are upwardly biased by springs 460. In FIG. 24, the rollers 64 and 80 are shown in a closed position in which they are in contact or close engagement. The nip rollers 64 and 80 are maintained in position by shaft 462 which is operated by nip engagement lever 470. Shaft 462 has notches or grooves 480 at either end adjacent the inner walls of side plates 436 and 438.

It will be seen that by rotating lever 470, shaft 462 will be rotated, bringing notches or grooves 480 into engagement with the upper ends of the gib plates 450 and 452. This will allow the gib plates 450 and 452 and nip roller 64 to move upwardly separating from lower nip roller 80. In the closed position, as shown in FIG. 24, the shaft 462 is rotated into engagement with the gib plates 450 and 452 to force the gib plates 450 and 452 and upper nip roller 64 downwardly into engagement with the lower roller 80, overcoming the bias of the springs 460.

Referring now to FIGS. 25 to 34, there is shown a third embodiment of apparatus for making a retroreflective label in accordance with the present invention. Elements which are the same or similar to elements described with respect to the preceding figures are identified by the same numerals. The apparatus is generally designated by the numeral 600 and includes a housing generally designated by the numeral 612 having a base 614, opposite side walls 616 and 618, a top 620 and a rear wall 622. The rear wall 622 of the housing is upwardly and forwardly inclined at panel 622a from the base 614 to a location where the rear wall extends vertically at panel 622b. As seen in FIG. 30, a discharge opening 630 is defined between the panels 622a and 622b through which the substrate and processed articles are discharged.

As best seen in FIGS. 30 to 32, an upper nip roller 64 extends transversely between the side walls 650 and 652 of the frame 642 spaced rearwardly from the edge of the side walls 650 and 652. The upper nip roller 64 includes an axial shaft 66 rotatable in suitable bearings or bushings 70 at opposite ends. The shaft 66 is covered by a cylindrical roller member 72 of resilient material such as rubber. Shaft 66 extends exteriorly of the side plate 618 and is shown carrying a hand crank 74 for manually rotating the roller and shaft. Alternatively, the rollers 64 and 80 can be powered by an electrical motor, not shown. A pinion gear 76 is secured to one end of the shaft 66 adjacent the interior surface of the side plate 618.

A second, lower nip roller 80 extends transversely between the side walls 616 and 618 positioned parallel to the upper nip roller 64. The lower nip roller 80 can be vertically aligned with the upper nip roller 64 but preferably is forwardly displaced a distance forward of the upper nip roller 64, as for example approximately ¼" as best seen in FIG. 30. The lower nip roller 80 has a shaft 82 which is rotatable in bearings 84 located at the interior of the opposite side walls. A pinion gear 86 is mounted at one end of the shaft 82. Pinion gear 86 engages the pinion gear 76 on the upper nip shaft 66 so that actuation of the upper nip roller 64 by means of the crank 74 or other power means will impart opposite rotation to both nip rollers 64 and 80 as indicated by the arrows in FIG. 32.

A primary advantage of the present invention is that various substrates can be provided to the user in a self-contained, ready-to-use cartridge 640 which allows the user simply to select and insert the appropriate cartridge. As indicated above, the device of the present invention can be used for multiple purposes for adhesive transfer and lamination. Adhesive can be transferred to either surface of the master and can be a dry adhesive. As shown, the cartridge 640 includes a lower feed roll 100 and an upper feed roll 110 as previously described, each containing a web of film or other flexible substrate material.

Figure 25:
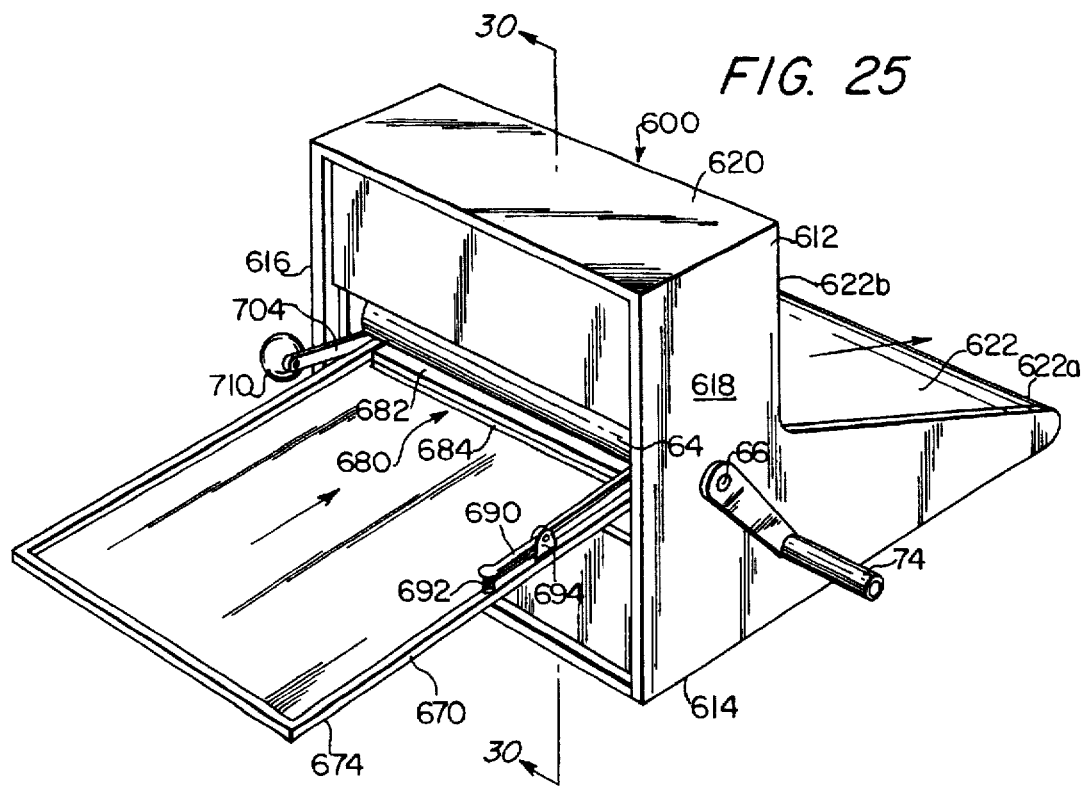
FIG. 25 is a perspective view of the transfer apparatus of the present invention.
Figure 26:
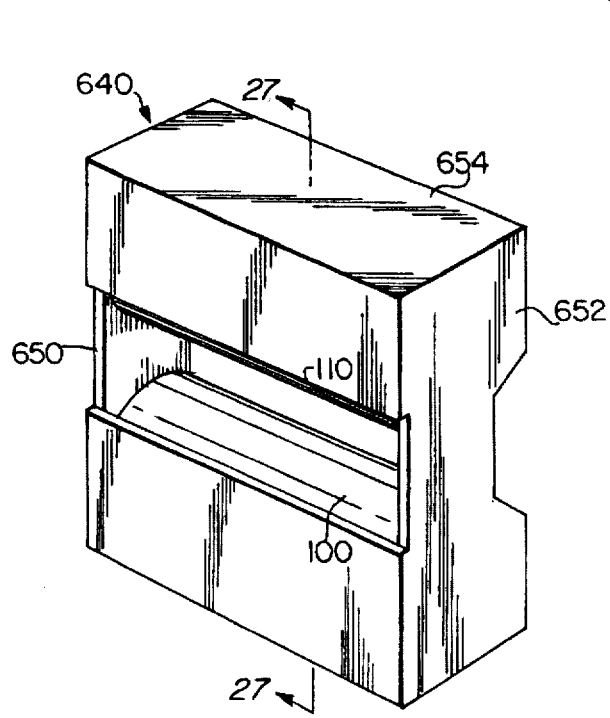
FIG. 26 is a perspective view of the supply roll containing a cartridge removed from the apparatus.
Figure 27:
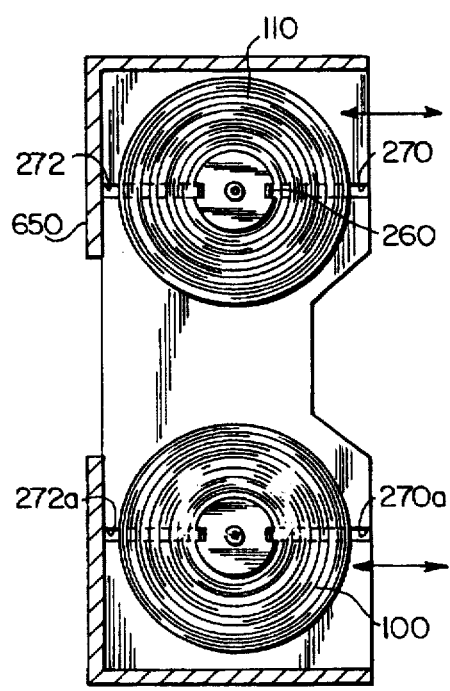
FIG. 27 is a sectional view taken along line 27—27 of FIG. 26.

The cartridge 640 includes a frame 642 having opposite side walls 650 and 652, a top 654, and bottom 656. A front wall 660 has a substantially rectangular opening 662 therein. The side walls 650 and 652 of cartridge 640 have horizontal recesses 662 provided therein for receiving a feed tray 670. Feed tray 670 has of a planar feeding surface 672 with opposite extending flanges 674 which flanges are removably insertable in the horizontal recesses 662 of cartridge 640. A wiper assembly 680 is mounted on the upper surface of the feed tray 670 as seen in FIGS. 25, 30, and 30A. The wiper assembly 680 has a bar 682 which extends transversely across the feed tray 670 adjacent the entrance to the nip area. The bar 682 has a pad 684 of resilient or soft material such as felt, soft plastics, fabric or rubber, which lightly engages the master as it passes between the wiper assembly 680 and the tray feeding surface 672. The wiper assembly 680 serves several functions, in that it cleans, smooths and guides the master as it enters the nip between the nip rollers 64 and 80. A particularly important function of the wiper assembly 680 is to tension the master substrate keeping it flat and aligned with the laminate and adhesive webs resulting in better alignment especially when feeding sheets intermittently. The wiper assembly 680 also has an arm 690 which is upwardly biased by a spring 692. Arm 690 is pivotally attached to the edge of the feed tray 670 at fulcrum 694 so that the wiper assembly 680 is pressed into light engagement with the material passing beneath the pad 684. The wiper bar 682 can be lifted to facilitate loading a master by manually depressing the outer end of the arm 690 against the force of spring 692. Preferably the pad 684 is replaceable as required.

Referring to FIGS. 28 and 29, a blade 702 having a cutting edge extends transversely adjacent the discharge opening 630. The blade 702 is movable vertically upward from a non-actuated position to a cutting position by means of lever 704 to which the blade 702 is attached. Lever 704 is pivotally secured to the interior of the housing side wall 616 at pivot rod 706. Downward movement of the lever 704 at handle 710 will move the blade 702 upward into engagement with anvil bar 712 which is fixed at the bottom of panel 622b and extends transversely.

Preferably, the blade 702 is mounted on a carrier 714 by means of pins 720 having compression springs 722 thereon which bias the blade 702 toward the anvil bar 712. Thus, when the cutting action occurs, the flat surface of the blade 702 moves along the anvil bar 712 which provides a self-cleaning action. The upper end of panel 622a is slightly convexly curved at 720 as seen in FIG. 30 to facilitate smooth discharge of the item being processed. The are a indicated by the numeral 720 can be coated with a suitable low-frictional material such as that sold under the trademark "Teflon".

A significant advantage of the present invention is that the lower and upper feed rolls 100 and 110 are provided to the user pre-wound and properly tensioned as previously described, so as not to overrun during operation and to provide proper tracking. The proper tensioning of the feed rolls 100 and 110 is accomplished by means of the tensioning device previously described with respect to FIGS. 15 and 16. Horizontal upper mounting slots 724a and 724b and horizontal lower mounting slots 726a and 726b are provided on the interior surfaces of the cartridge side walls 650 and 652 for receiving mounting tabs 260a and 260b projecting outwardly from the end plates 230 of the tensioning devices provided in feed rolls 100 and 110.

Thus, it will be seen that inserting a supply of suitable feed substrate is easily accomplished. The user simply selects the appropriate cartridge 640 and positions the cartridge 640 in the opening at the front side of the housing 612. The cartridge 640 is locked in place in the housing 612 in a vertical position by locking detent members 730. The feed rolls 100 and 110 can be various types of stock such as clear laminates, paper or film for removing excessive adhesive or rolls of material having a loose adhesive coating and a release coating on the opposite surface. The feed tray 670 is inserted in a generally horizontal position in the opposite horizontal recesses 664 in the cartridge side walls 650 and 652.

As mentioned above, the device 400 can be used as a lamination device or as an adhesive transfer device. In the case of use as an adhesive transfer device, the lower feed roll 100 comprises a film carrying an easily transferable adhesive. The upper feed roll 110 would typically be a web of flexible carrier material having release characteristics on a lower surface and adhesive coating on the other surface. With rolls of this type in position, the end of the web of the lower feed roll 100 is extended over the lower nip roller 80. The upper feed roll 110, in the case of adhesive transfer, will consist of a web of material such as inexpensive paper or film, having an affinity for adhesive. The end of the web is extended between the nip rollers 64 and 80 with the end of the web adhesively secured to the web of the master in the lower feed roll 100.

Figure 20:
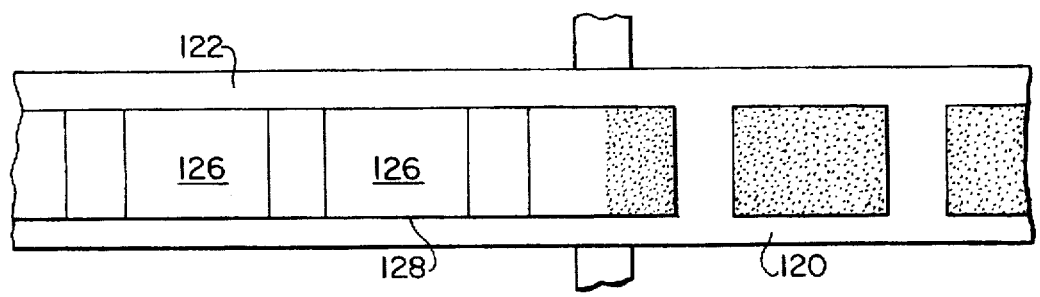
FIG. 20 is a plan view of the feed master showing adhesive applied.
Figure 22:
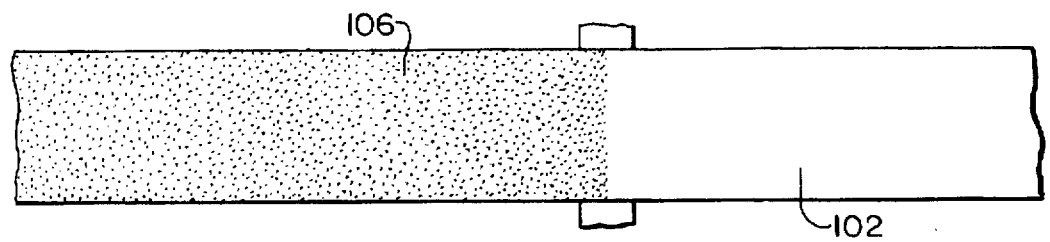
FIG. 22 shows the removal of adhesive from the lower web.

The master 120 is as previously described with respect to FIGS. 20 to 22. The master 120 is aligned on the feed tray 670 with the leading free edge of the master 120 positioned on the exposed adhesive surface 106 of the lower feed stock material 102 at the nip roller interface. The slight forward protrusion of the lower nip roller 80 facilitates securing the master 120 at this location. The web 112 of the upper feed roller 110 is fed from the cartridge 640 to the nip roller interface on the upper side of master 120.

The operator then actuates the machine 600 by operating the crank 74 which will rotate the upper nip roller 64 and by means of the inter-engaging pinion gears 76 and 86, will cause rotation of the lower nip roller 80. The rotation will also advance the upper web 112, the lower web 102, and the master 120. The master 120 is smoothed, guided, and wiped clean as it passes between the wiper 680 and the upper surface of the tray. As the master 120 proceeds between the nip rollers 64 and 80 in the interface nip area, the exposed adhesive 106 from the lower web 102 will be transferred to the lower surface of the master 120. The upper web 112 will pick up any excessive adhesive not transferred to the master 120, as for example adhesive 106 in the areas outside the perimeter of the label areas 128. As previously described, the decal assembly can then be easily severed from the webs as it emerges from the discharge opening at the rear of the machine.

Note that as previously described, the master 120 can be oriented with either printing or indicia facing upwardly or downwardly depending on the user's requirements.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method of making a decal assembly, comprising the steps of:
   (a) providing a label having fixed information printed on one face thereof;
   (b) printing variable information on the label on the same face as the fixed information;
   (c) assembling the label with the fixed and variable information thereon into a decal assembly comprising the label, a backing sheet on which the label is positioned, a web of pressure-sensitive adhesive of substantially uniform tackiness over its entire surface covering the label and at least a portion of the backing sheet surrounding the label, and a release liner positioned over the adhesive web and the label.

2. The method of claim 1, further comprising the step of adhering a laminate sheet to the face of the label on which the fixed and variable information is printed, between said steps (b) and (c).

3. A method of making a motor vehicle decal assembly using a label having fixed information printed thereon, comprising the steps of:
   (a) obtaining from a customer variable information identifying a motor vehicle for which a label having fixed information printed thereon is being issued to the customer;
   (b) entering into a computer the information obtained from the customer;
   (c) printing the variable information on the label using a printer controlled by the computer; and
   (d) assembling the label with the fixed and variable information thereon into a decal assembly comprising the label, a backing sheet on which the label is non-adhesively positioned, a web of pressure-sensitive adhesive of substantially uniform tackiness over its entire surface covering the label and at least a portion of the backing sheet surrounding the label, and a release liner positioned over the adhesive web and the label.

4. A method of making a motor vehicle decal assembly using a label having fixed information printed thereon, comprising the steps of:
   (a) obtaining from a customer variable information identifying a motor vehicle for which a label having fixed information printed thereon is being issued to the customer;

(b) entering into a computer the information obtained from the customer, (c) printing the variable information on the label using a printer controlled by the computer; and (d) assembling the label with the fixed and variable information thereon into a decal assembly comprising the label, a backing sheet on which the label is positioned, an adhesive web covering the label and at least a portion of the backing sheet surrounding the label, and a release liner positioned over the adhesive web and the label.

5. The method of claim 4, further comprising the step of adhering a laminate sheet to the face of the label on which the fixed and variable information is printed, between said steps (c) and (d).

6. A decal assembly comprising:

a backing sheet;

a label that is non-adhesively positioned on the backing sheet;

an adhesive web covering the label and at least a portion of the backing sheet surrounding the label, the adhesive web being pressure-sensitive and substantially uniformly tacky over its entire surface; and a release liner positioned over the adhesive web and the label.

7. The decal assembly of claim 6, wherein the release liner is substantially co-extensive with the adhesive web.

8. The decal assembly of claim 6, further comprising a clear laminate sheet adhered to the label and interposed between the label and the backing sheet.

9. The decal assembly of claim 6, wherein the label is made from retroreflective sheeting.

10. The decal assembly of claim 6, wherein the label has fixed and variable information printed on one of the front and back faces thereof.

11. The decal assembly of claim 10, wherein the variable information includes the vehicle license plate characters.

12. The decal assembly of claim 11, wherein the variable information includes the vehicle identification number.

13. A decal assembly comprising:

a backing sheet having an inner face, an outer face, a pair of opposed side edges, and a pair of opposed end edges, the inner face of the backing sheet having an affinity for adhesive;

a label non-adhesively positioned on the inner face of the backing sheet, the label having a front face, a back face, a pair of opposed side edges, and a pair of opposed end edges, the label having a width and a length smaller than the distance between the side edges of the backing sheet, the back face of the label facing the inner face of the backing sheet and the side and end edges of the label being positioned inwardly of the side and end edges of the backing sheet;

a release liner sheet positioned over the label and the backing sheet, the release liner sheet having a front face, a back face, a pair of opposed side edges, and a pair of opposed end edges, the release liner sheet having a width greater than the width of the label and smaller than the width of the backing sheet, the inner face of the release liner sheet facing the inner face of the backing sheet and the front face of the label, the side edges of the release liner sheet being positioned outwardly of the side edges of the label, and the end edges of the release liner sheet being positioned outwardly of the end edges of label and substantially in registration with the end edges of the backing sheet; and a web of pressure sensitive adhesive carried by the inner face of the release liner sheet and interposed between the inner face of the release liner sheet and the label, the web having substantially the same dimensions as the release liner sheet, the web being pressure-sensitive and substantially uniformly tacky over its entire surface, and the release liner sheet having release characteristics such that the adhesive web is loosely adhered to the inner face of the release liner sheet.

14. The decal assembly of claim 13, further comprising a clear laminate sheet adhered to the label and interposed between the label and the backing sheet.

15. The decal assembly of claim 13, wherein the label is made from retroreflective sheeting.

16. The decal assembly of claim 13, wherein the label has fixed and variable information on one of the front and back faces thereof.

17. The decal assembly of claim 16, wherein the variable information includes the vehicle license plate characters.

18. The decal assembly of claim 17, wherein the variable information includes the vehicle identification number.

19. The decal assembly of claim 13, the adhesive being a non-aggressive adhesive with respect to the backing sheet.

20. A motor vehicle decal assembly comprising:

a backing sheet having an inner face, an outer face, a pair of opposed side edges, and a pair of opposed end edges, the inner face of the backing sheet having an affinity for adhesive;

a label non-adhesively positioned on the inner face of the backing sheet, the label having a front face, a back face, a pair of opposed side edges, and a pair of opposed end edges, the label having a width and a length smaller than the distance between the side edges of the backing sheet, the back face of the label facing the inner face of the backing sheet and the side and end edges of the label being positioned inwardly of the side and end edges of the backing sheet, the label having variable information printed on one of the front and back faces thereof identifying a vehicle for which the label is being issued;

a release liner sheet positioned over the label and the backing sheet, the release liner sheet having a front face, a back face, a pair of opposed side edges, and a pair of opposed end edges, the release liner sheet having a width greater than the width of the label and smaller than the width of the backing sheet, the inner face of the release liner sheet facing the inner face of the backing sheet and the front face of the label, the side edges of the release liner sheet being positioned outwardly of the side edges of the label, and the end edges of the release liner sheet being positioned outwardly of the end edges of label and substantially in registration with the end edges of the backing sheet; and a web of pressure sensitive adhesive carried by the inner face of the release liner sheet and interposed between the inner face of the release liner sheet and the label, the web having substantially the same dimensions as the release liner sheet, the adhesive being a non-aggressive, pressure-sensitive adhesive which is substantially uniformly tacky over its entire surface, and the release liner sheet having release characteristics such that the adhesive web is non-aggressive adhesive loosely adhered to the inner face of the release liner sheet.

21. The decal assembly of claim 20, further comprising a clear laminate sheet adhered to the label and interposed between the label and the backing sheet.

22. The decal assembly of claim 20, wherein the variable information includes the vehicle license plate characters.

23. The decal assembly of claim 15, wherein the variable information includes the vehicle identification number.

24. The decal assembly of claim 6, wherein the label comprises a strip having a pair of opposed side edges and a fold line intermediate the side edges dividing the label into first and second portions, the strip being folded at the fold line and the first portion facing the adhesive web and the second portion facing the backing sheet.

25. The decal assembly of claim 24, wherein the label further comprises retroreflective sheeting adhered to the first portion and facing the adhesive web.

26. The decal assembly of claim 25, wherein the retroreflective sheeting is substantially coextensive with the first portion.

27. The decal assembly of claim 25, wherein the strip is a thermal transfer printable strip.

28. The decal assembly of claim 27, wherein the strip is made of a material which is resistant to heat and water.

29. The decal assembly of claim 27, wherein the strip is made of a material chosen from the group consisting of a polymer and a polypropylene polyester.

30. The decal assembly of claim 25, wherein the fold line is perforated to define a line of separation between the first and second portions.

31. The decal assembly of claim 25, wherein the retroreflective sheeting is printed for use as a decal and the second portion is printed for use as a receipt accompanying the decal.

* * * * *

UNITED STATES PATENT AND TRADEMARK OFFICE
CERTIFICATE OF CORRECTION

PATENT NO.: 5,788,796

DATED: August 4, 1998

INVENTOR(S): Look et al.

It is certified that error appears in the above-identified patent and that said Letters Patent is hereby corrected as shown below:

Col. 19, line 1, "15" should read --20--.

Signed and Sealed this

Fifth Day of January, 1999

*Attest:*

*Attesting Officer*

*Acting Commissioner of Patents and Trademarks*